US012676092B2

(12) United States Patent
Hu et al.

(10) Patent No.: US 12,676,092 B2
(45) Date of Patent: *Jul. 7, 2026

(54) AUTOSTEREOSCOPIC DISPLAY APPARATUS

(71) Applicant: JoyVision Technology., CO LTD, Taoyuan City (TW)

(72) Inventors: Cheng-Chung Hu, Taoyuan City (TW); Han-Hsun Kuo, Taoyuan City (TW)

(73) Assignee: JOYVISION TECHNOLOGY., CO LTD, Taoyuan City (TW)

( * ) Notice: Subject to any disclaimer, the term of this patent is extended or adjusted under 35 U.S.C. 154(b) by 0 days.

This patent is subject to a terminal disclaimer.

(21) Appl. No.: 19/241,571

(22) Filed: Jun. 18, 2025

(65) Prior Publication Data

US 2026/0127988 A1 May 7, 2026

Related U.S. Application Data

(63) Continuation-in-part of application No. 19/068,197, filed on Mar. 3, 2025, now Pat. No. 12,366,765.

(30) Foreign Application Priority Data

Nov. 6, 2024 (TW) ................................. 113142612

(51) Int. Cl.
| | |
|---|---|
| *G09G 3/00* | (2006.01) |
| *H04N 13/305* | (2018.01) |
| *H04N 13/398* | (2018.01) |

(52) U.S. Cl.
CPC ........... *G09G 3/003* (2013.01); *H04N 13/305* (2018.05); *H04N 13/398* (2018.05); *G09G 2320/0209* (2013.01); *G09G 2320/0686* (2013.01)

(58) Field of Classification Search
None
See application file for complete search history.

(56) References Cited

U.S. PATENT DOCUMENTS

| | | | |
|---|---|---|---|
| 2008/0117231 A1 | 5/2008 | Kimpe | |
| 2012/0200562 A1* | 8/2012 | Kashiwagi | H04N 13/317 |
| | | | 345/419 |
| 2013/0021332 A1* | 1/2013 | Ooi | H04N 13/271 |
| | | | 345/419 |
| 2013/0278736 A1* | 10/2013 | Saito | G09G 3/003 |
| | | | 348/59 |
| 2016/0252759 A1* | 9/2016 | Woodgate | H04N 13/38 |
| | | | 348/54 |
| 2019/0082168 A1* | 3/2019 | Lee | H04N 13/31 |
| 2024/0089422 A1* | 3/2024 | Kusafuka | H04N 13/376 |
| 2024/0112628 A1 | 4/2024 | Hou | |

* cited by examiner

*Primary Examiner* — Sepehr Azari

(74) *Attorney, Agent, or Firm* — McClure, Qualey & Rodack, LLP

(57) ABSTRACT

A display apparatus for implementing autostereoscopic display is disclosed. The apparatus includes a display pixel array configured to generate images, and an optical element array disposed above the pixel array, the optical elements being configured to direct different images to the viewer's left and right eyes to enable autostereoscopic perception. A memory stores computer-executable instructions, and a processor executes the instructions to dynamically adjust the brightness of individual pixels. An optimized brightness is derived from a continuously differentiable, monotonically increasing S-shaped function.

8 Claims, 15 Drawing Sheets

208

B

D $$B = \frac{1 + \tanh(C(D - 0.5))}{2}$$

AUTOSTEREOSCOPIC DISPLAY APPARATUS

CROSS-REFERENCE TO RELATED APPLICATIONS

This application is a continuation-in-part of U.S. patent application Ser. No. 19/068,197, filed on Mar. 3, 2025, now U.S. Pat. No. 12,366,765, which is incorporated herein by reference in its entirety. The U.S. application claims priority under 35 U.S.C. § 119 (a) to Taiwanese Patent Application No. 113142612, filed on Nov. 6, 2024, in Taiwan, Republic of China, which is also incorporated herein by reference.

PRIOR ART

When producing glasses-free 3D visuals with lenticular lenses, the aim is to distinctly channel light into separate colors, delivering unique images to each eye. However, crosstalk (where images intended for one eye bleed into the other) can occur at the boundaries, causing visual disturbances like ghosting. To address this, adjusting screen pixel brightness by deactivating pixels near the edges of the lenticular lens pitch can help reduce crosstalk, resulting in a clearer 3D image. The technique of deactivating pixels near lenticular lens pitches is well established in the art and is described in Patent CN110662012A. However, excessive pixel deactivation may lead to a reduction in overall display brightness, and viewers may perceive black grid patterns, resembling a screen door effect, during 3D viewing.

BACKGROUND OF THE INVENTION

The present invention optimizes brightness dynamically, ensuring clearer, high-quality autostereoscopic displays while reducing crosstalk artifacts.

SUMMARY OF THE INVENTION

It is an object of the present invention to provide a display apparatus for implementing autostereoscopic display. The apparatus comprises a display pixel array configured to generate images for viewing by a user, and an optical element array disposed above the display pixel array. The optical elements are arranged in parallel and configured to direct different images to the viewer's left and right eyes, thereby enabling stereoscopic perception without the need for special glasses.

The apparatus further includes a memory configured to store computer-executable instructions and a processor configured to execute those instructions. The processor is operative to obtain, for any given pixel, a distance d between the pixel and a nearest end of a boundary that separates adjacent images. It then calculates a distance ratio D, defined as $D=d/Lp$, where $Lp$ is the pitch of the optical element. Based on this distance ratio D, the processor determines an optimized brightness value ratio B for the pixel using an S-shaped function. This function is continuously differentiable, monotonically increasing, approaches 0 as D approaches 0, approaches 1 as D approaches 1, and has an inflection point at $D=0.5$. This brightness modulation reduces crosstalk near image boundaries and improves the stereoscopic image quality presented to the viewer.

In another preferred embodiment, there is provided an autostereoscopic display apparatus, comprising: an array of display pixels arranged in rows and columns; and an array of elongated optical elements extending parallel to one another and overlying the display pixels, wherein the optical elements are slanted at an angle relative to the columns of display pixels; for any given display pixel, an optimized brightness is determined based on the distance from the given pixel to the nearest end of a boundary separating adjacent images. In a preferred embodiment, the adjacent images include a plurality of pixel sets, and through which the pixel sets are viewed, the optical elements acting as optical directing means to provide separate images to a viewer's eyes, thereby providing an autostereoscopic display to the viewer.

In another preferred embodiment, the optical element is a liquid crystal lens, including a plurality of lens units which repeatedly create groups of display pixels separated by boundaries between adjacent images. In one embodiment, starting from the pixels near said boundary, the brightness of each pixel is progressively increased. In another embodiment, a system for providing separate images to a viewer's eyes to thereby provide an autostereoscopic display to the viewer, the system comprising: an autostereoscopic display apparatus comprising means for producing a display which comprises an array of display pixels arranged in rows and columns, and an array of elongated lenticular elements extending parallel to one another overlying the display pixel array and through which the display pixels are viewed, the lenticular elements acting as optical directing means to provide separate images to a viewer's eyes to thereby provide an autostereoscopic display to the viewer, the lenticular elements having a pitch greater than a distance from the pixel to the nearest end of a boundary between adjacent images in the row direction.

In another embodiment, the autostereoscopic display apparatus consists of a display pixel array arranged in rows and columns. Above this array, an array of elongated optical elements (e.g., lenticular lenses or liquid crystal lenses) is positioned in a Z-direction, slanted at an angle relative to the display pixel columns. These optical elements direct different pixel sets to each of the viewer's eyes, enabling autostereoscopic 3D viewing without glasses.

To reduce crosstalk, brightness optimization is applied. For any given display pixel, brightness is determined by its distance from the nearest boundary separating adjacent images. The brightness increases progressively from boundary pixels toward the central pixels of each viewpoint image (which have minimal crosstalk and are set to the highest brightness).

In an alternative embodiment, liquid crystal lenses replace the optical elements. These lenses extend in a third direction, repeatedly forming groups of display pixels, separated by boundaries between adjacent images. This approach further enhances the autostereoscopic effect. The proposed system effectively reduces crosstalk and improves 3D image clarity by dynamically adjusting pixel brightness based on their position relative to image boundaries.

These and other objectives of the present invention will no doubt become obvious to those of ordinary skill in the art after reading the following detailed description of the preferred embodiment that is illustrated in the various figures and drawings.

DETAILED DESCRIPTION OF THE INVENTION

Reference will now be made in detail to embodiments, examples of which are illustrated in the accompanying drawings. In the following detailed description, numerous specific details are set forth to provide a thorough understanding of the present invention. However, it will be apparent to one of ordinary skill in the art that the present invention may be practiced without these specific details. In other instances, well-known methods, components, have not been described in detail so as not to unnecessarily obscure aspects of the embodiments.

Figure 1A:
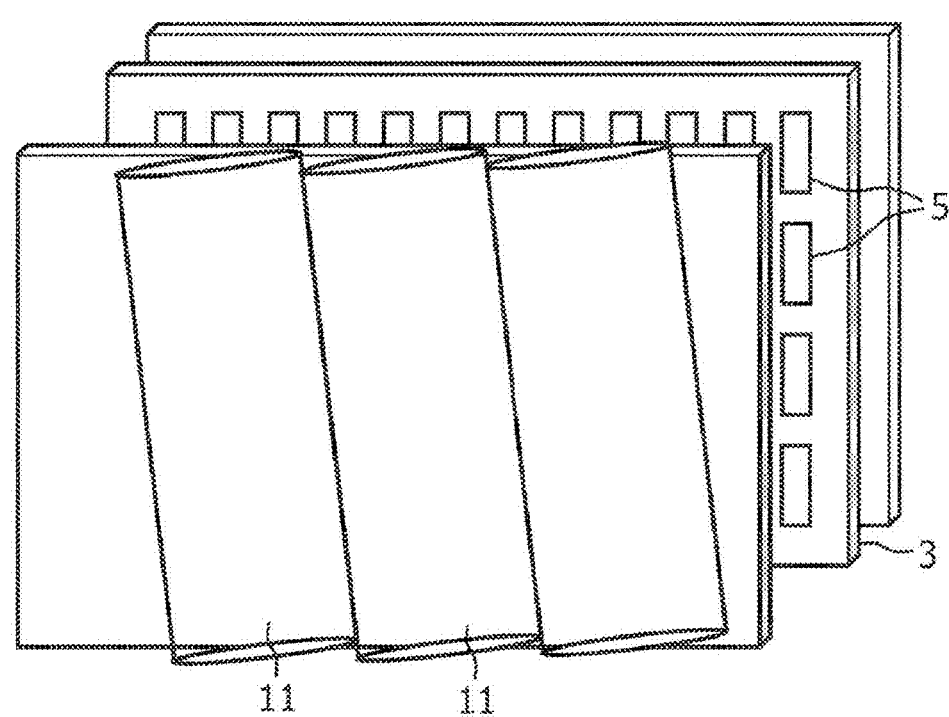
FIGS. 1A-1B illustrate a conventional autostereoscopic display.
Figure 1B:
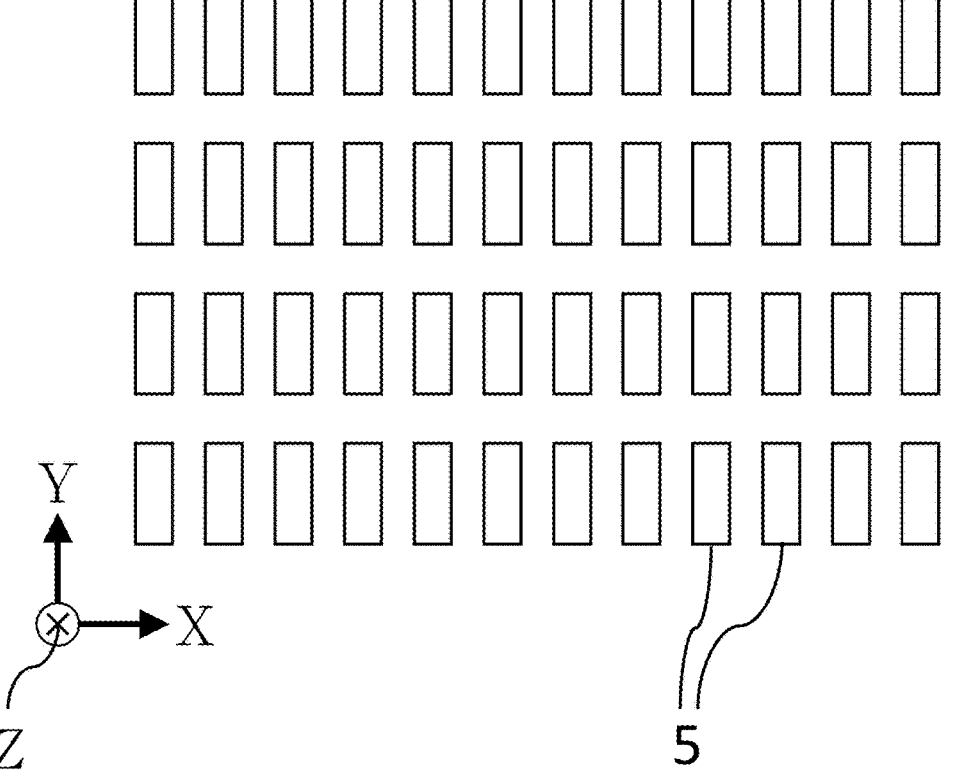
Figure 2A:
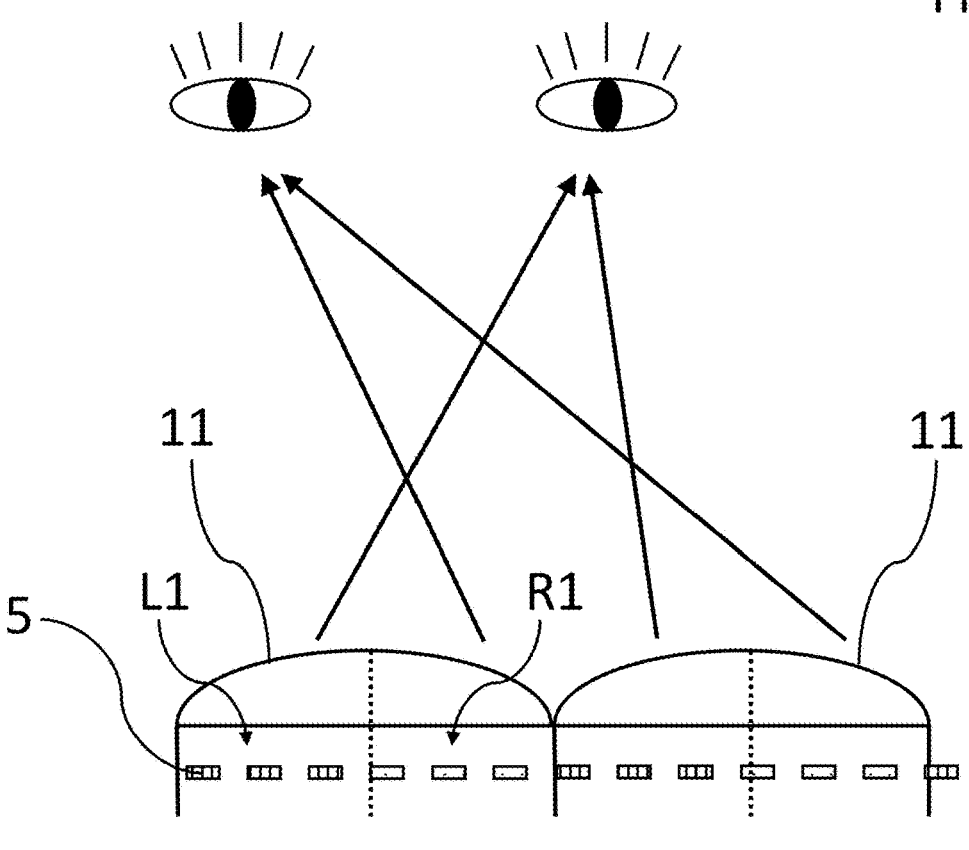
FIGS. 2A-2B provide schematic plan views of a typical autostereoscopic display.
Figure 2B:
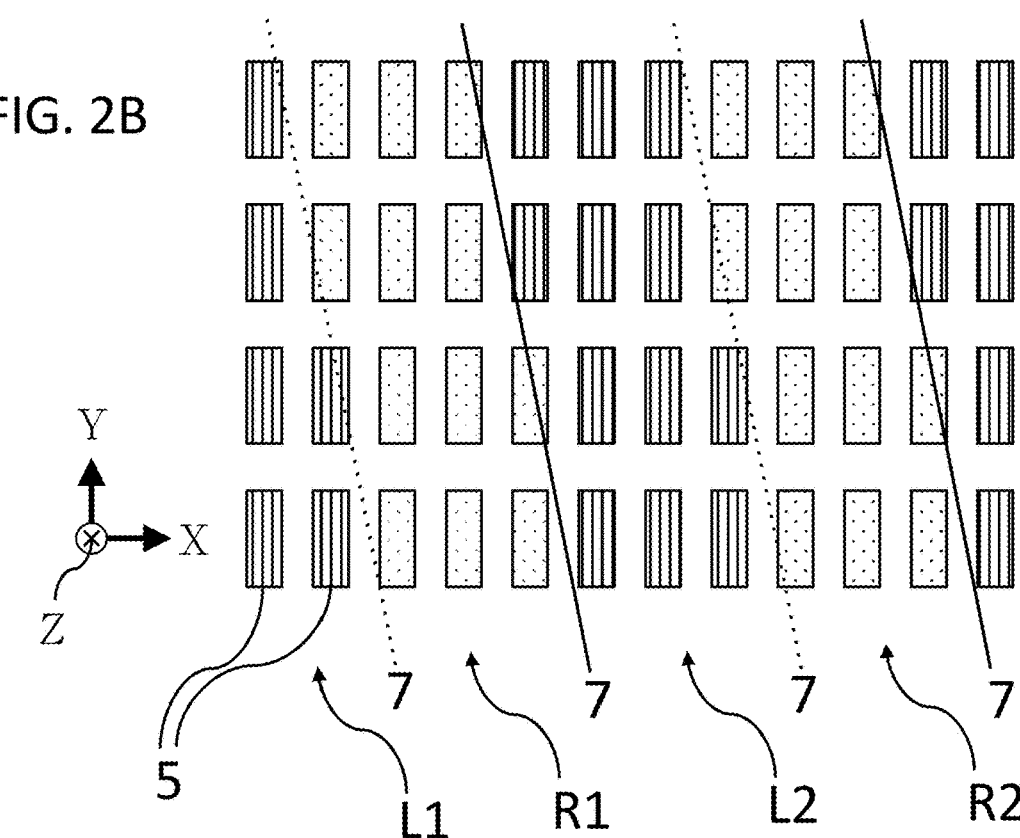

As shown in FIGS. 1A and 1B, an autostereoscopic display apparatus includes an array 3 of display pixels 5 arranged in rows and columns. The array 3 is structured along a row direction (X-axis) and a column direction (Y-axis). Positioned in a Z direction (perpendicular to both the X and Y directions) is another array of elongated optical elements 11. These optical elements are aligned parallel to one another and overlie the display pixel array 3. As illustrated in FIGS. 2A and 2B, the display pixels 5 are viewed through the optical elements 11, which function to direct separate images (e.g., pixel sets R1, R2, L1, L2) to the viewer's eyes, thereby enabling autostereoscopic 3D viewing.

Figure 3:
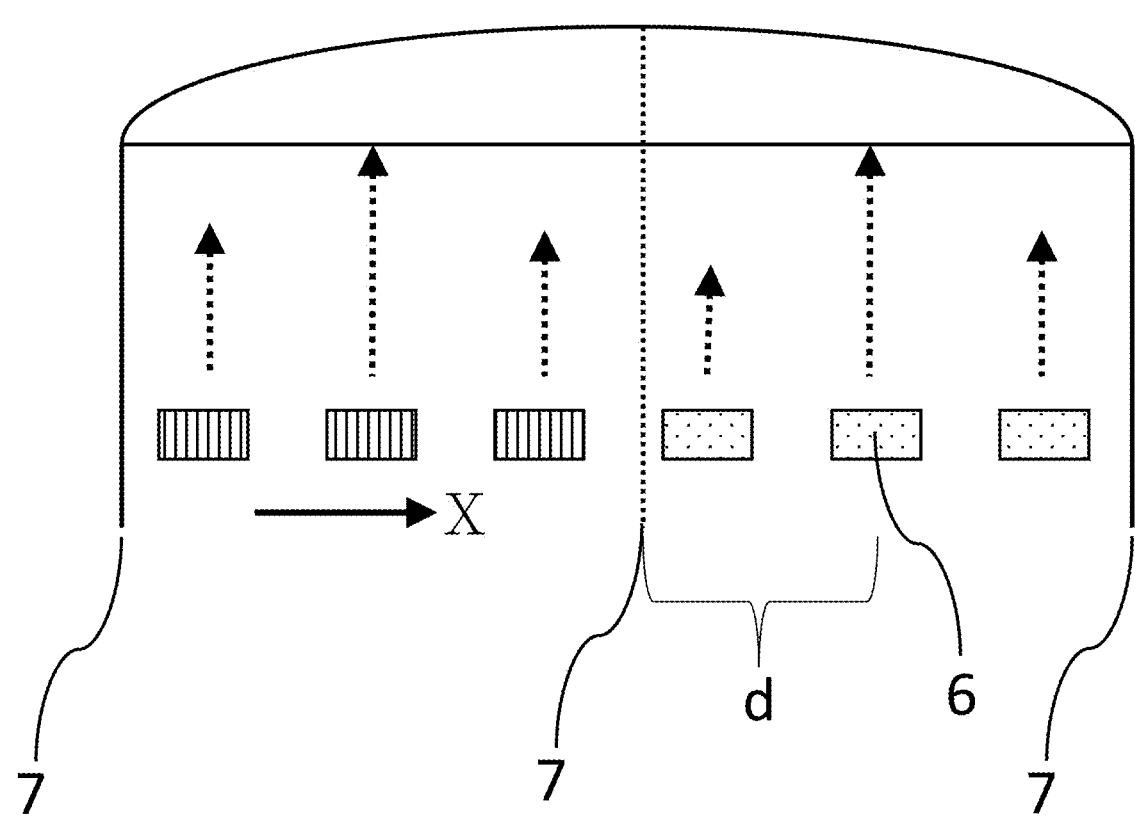
FIG. 3 illustrates an embodiment of the apparatus that determines optimized brightness based on the distance from a given pixel to the nearest boundary end.

The optical elements 11 are slanted at an angle relative to the display pixel columns (Y-axis) to optimize the separation of visual information, thereby repeatedly creating groups of display pixels (e.g., pixel sets R1, R2, L1, L2), each of which consists of adjacent display pixels 5. Slanted structures of autostereoscopic display are well known in the art and described in U.S. Pat. No. 6,064,424A. More prior art can be found in Classification G02B30/27—Optical systems or apparatus for producing three-dimensional [3D] effects, e.g., stereoscopic images by providing first and second parallax images to an observer's left and right eyes in autostereoscopic displays involving lenticular arrays. Additional prior art can be found in Classification H04N13/317-Image reproducers for viewing without the aid of special glasses, i.e., using autostereoscopic displays with slanted parallax optics As shown in FIG. 3, for any given pixel 6 of the display pixels, an optimized brightness may be determined based on a distance d from given pixel 6 to the nearest end (in the row direction X) of a boundary 7 separating adjacent images. Referring back to FIGS. 2A, 2B, the adjacent images include a plurality of pixel sets (e.g., pixel sets R1, L1, L2, R2), and through which the pixel sets are viewed, the optical elements acting as optical directing means to provide separate images to a viewer's eyes, thereby providing an autostereoscopic display to the viewer.

Figure 4A:
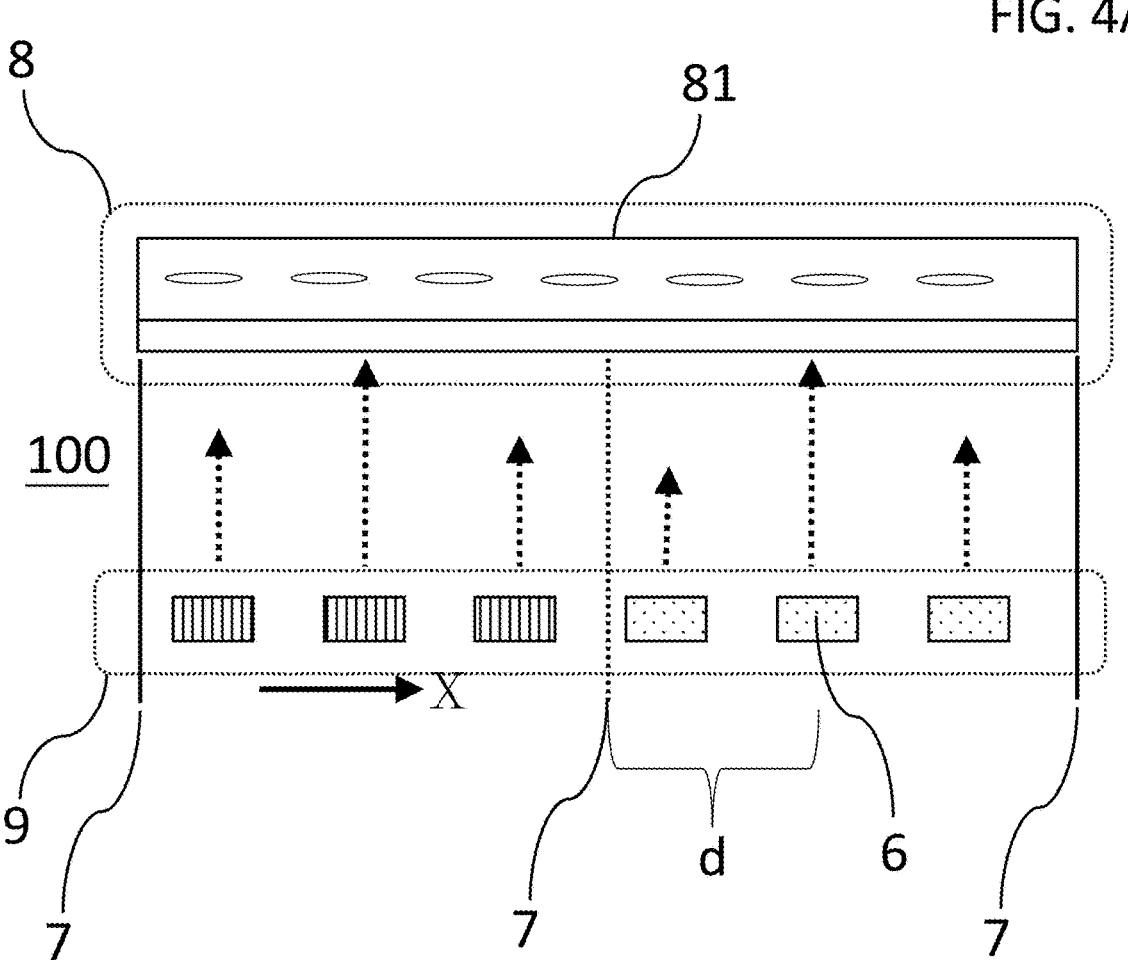
FIGS. 4A-4B depict a liquid crystal lens that repeatedly forms groups of display pixels, separated by boundaries.
Figure 4B:
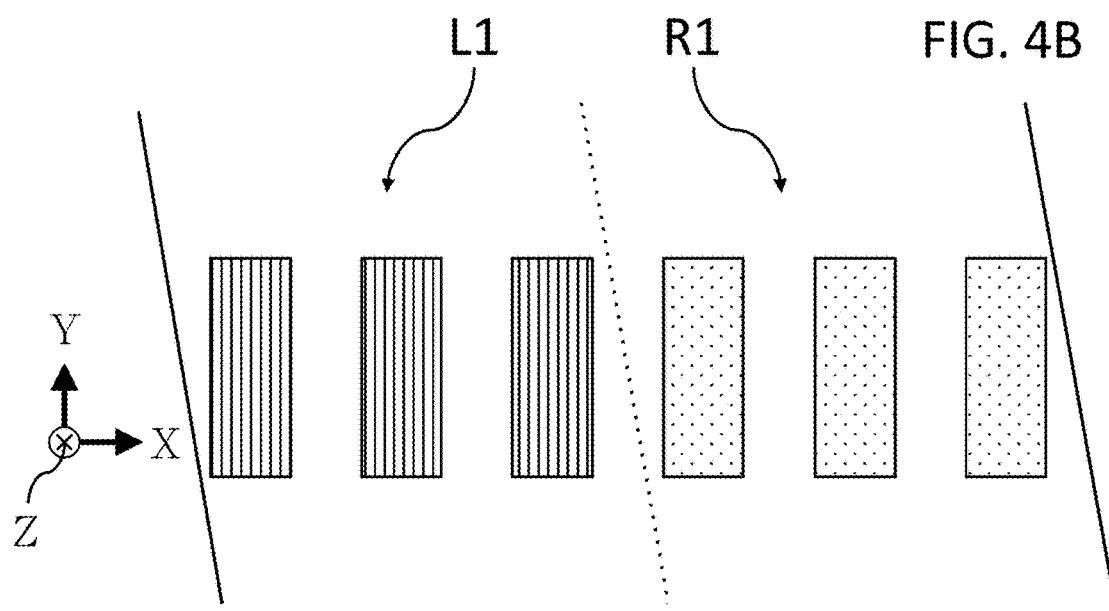

In another embodiment, as depicted in FIGS. 4A and 4B, the optical elements may be a liquid crystal lens 8 (known in the art and described in U.S. Pat. No. 8,581,815B2). A display device 100 may comprise a display panel 9 configured to generate images and comprising a display surface having the row direction X and the column direction Y substantially perpendicular to the row direction X; the liquid crystal lens 8 may be disposed on the display panel 9, and comprises a plurality of lens units 81 each of which may extend in a third direction crossing the column direction Y. The plurality of lens units 81 repeatedly create groups of display pixels (e.g., pixel sets R1, L1). The plurality of groups of display pixels are separated by boundaries 7 between adjacent images.

Figure 5:
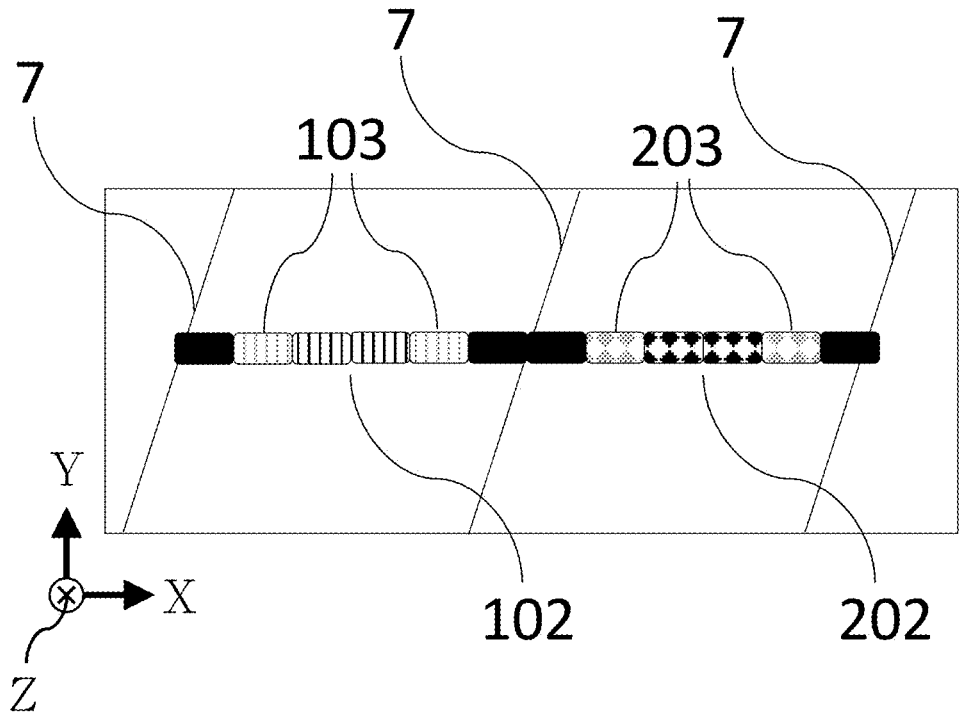
FIG. 5 illustrates another embodiment, where pixels located between a boundary and a set of central pixels are dimmed relative to the central pixels of each image.

In an embodiment, refer to FIG. 5, in the row direction X, the brightness of each pixel is gradually increased. The central pixels of each viewpoint image, 102 and 202, experience the least crosstalk; therefore, they are set to the highest brightness. Starting from the pixels near boundary 7, the brightness of each pixel is progressively increased. For example, the pixels 103, 203 (which are located between boundary 7 and the central pixels 102, 202) are set to a lower brightness than the central pixels 102, 202 of each viewpoint image. In view of that, starting from the pixels near said boundary, the brightness of each pixel may be progressively increased; the pixels which are located between any boundary and any central pixel may be set to a lower brightness than the central pixels of each image.

Figure 6A:
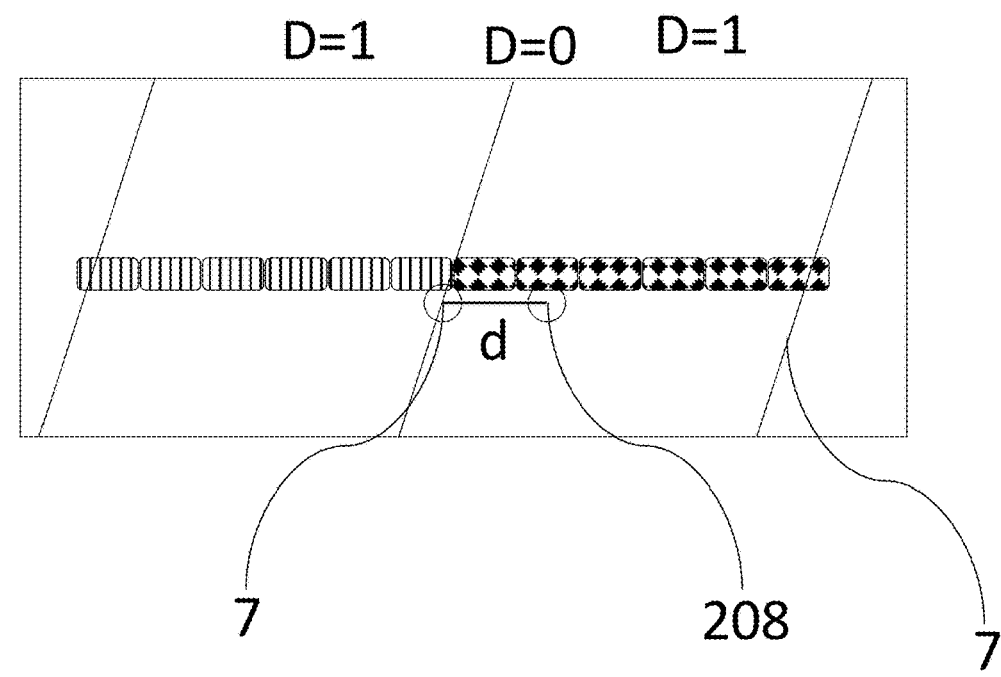
FIGS. 6A-6E present another embodiment incorporating an equation for calculating the optimized brightness of any given pixel.
Figure 6B:
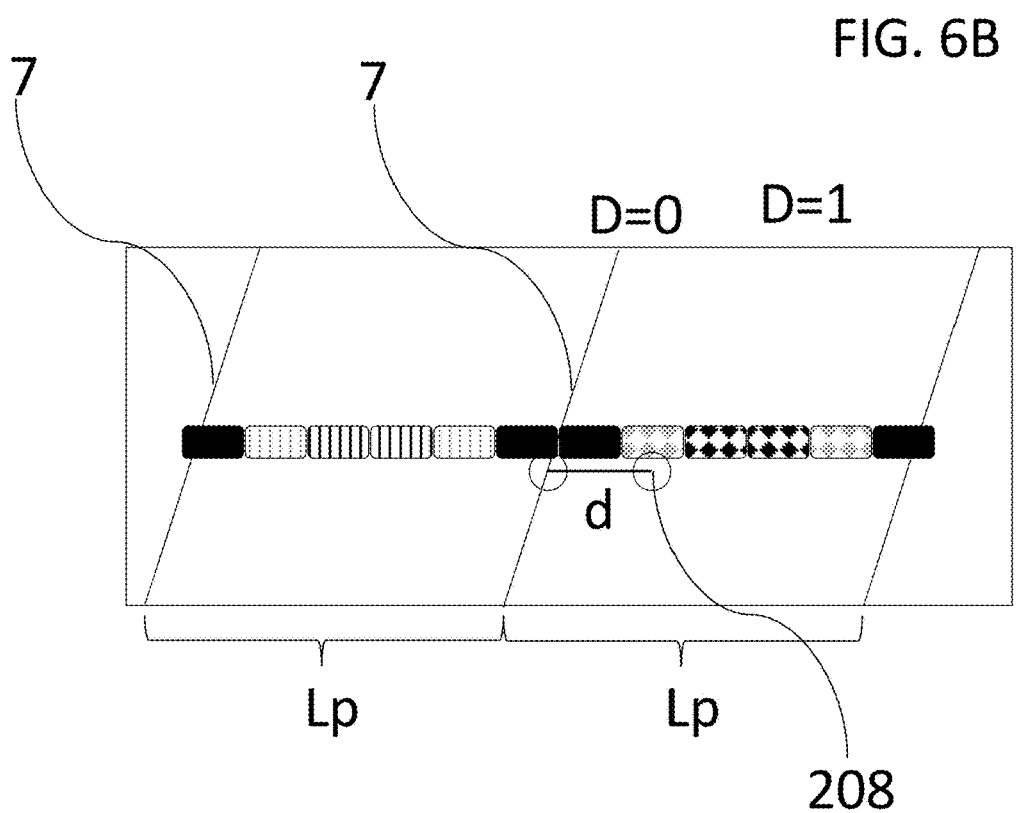

In another embodiment, as shown in FIG. 6A, an equation may be used to calculate the display brightness of each pixel. For any given pixel (e.g., pixel 208), its distance from the nearest boundary 7 between adjacent viewpoint images is measured and used as an input D for equation. The equation then determines the appropriate brightness level for the pixel. Since the central pixels of each viewpoint image experience the least crosstalk, the equation is designed such that when D=1, the output reaches its maximum value of 1. In view of that, the optimized brightness may be determined based on a following equation: $B=1/(1+e\char`^(-C*(D-0.5)))$, wherein in equation: C is a coefficient greater than 0; D is a ratio of said distance (from given pixel to the nearer end of boundaries) to a pitch Lp (i.e., the pitch between adjacent boundaries 7, which separate those adjacent images made from different pixel sets) of the optical elements as shown in FIG. 6B; and B is a ratio of the optimized brightness of any given pixel to the maximum brightness of any given pixel.

Figure 6C:
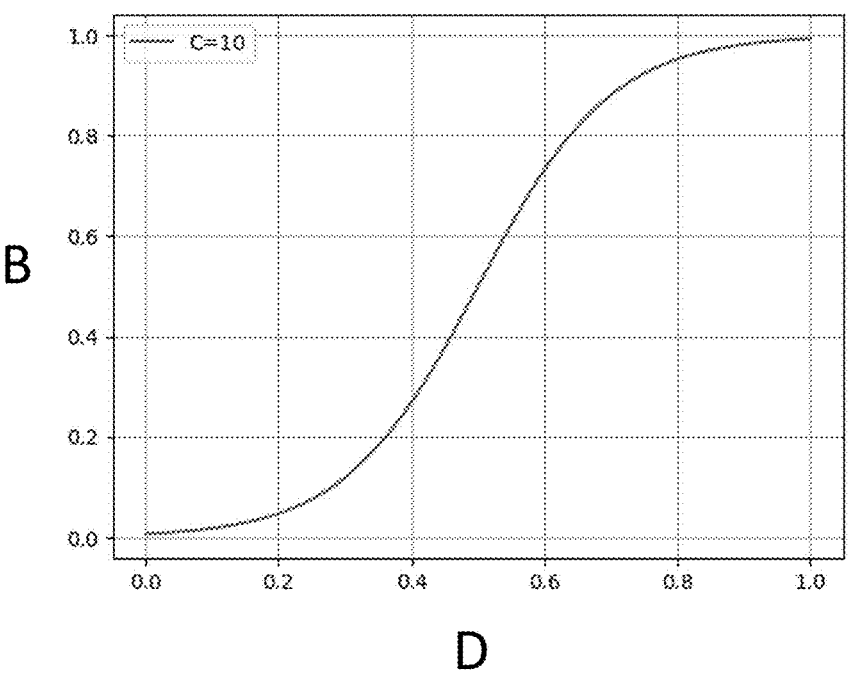
Figure 6D:
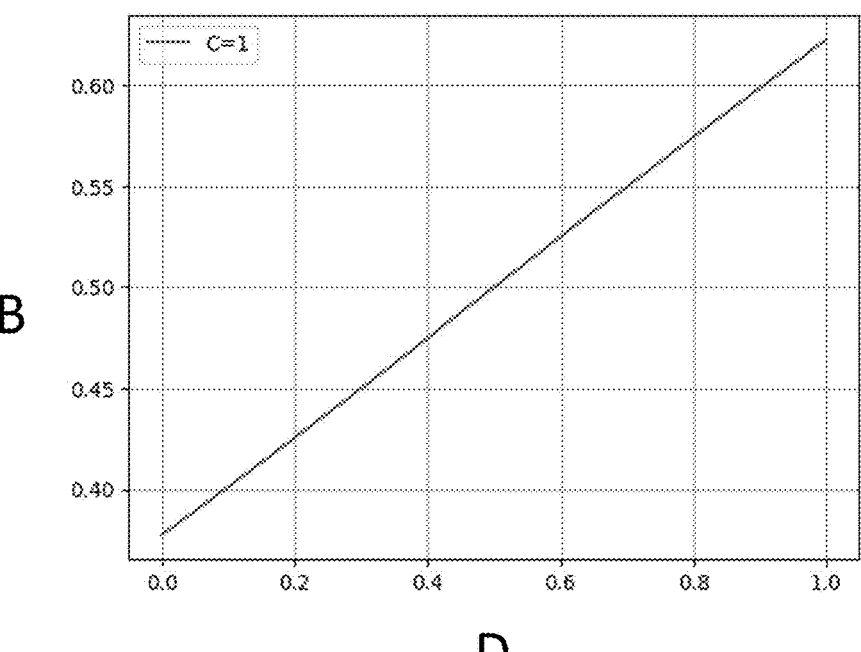
Figure 6E:
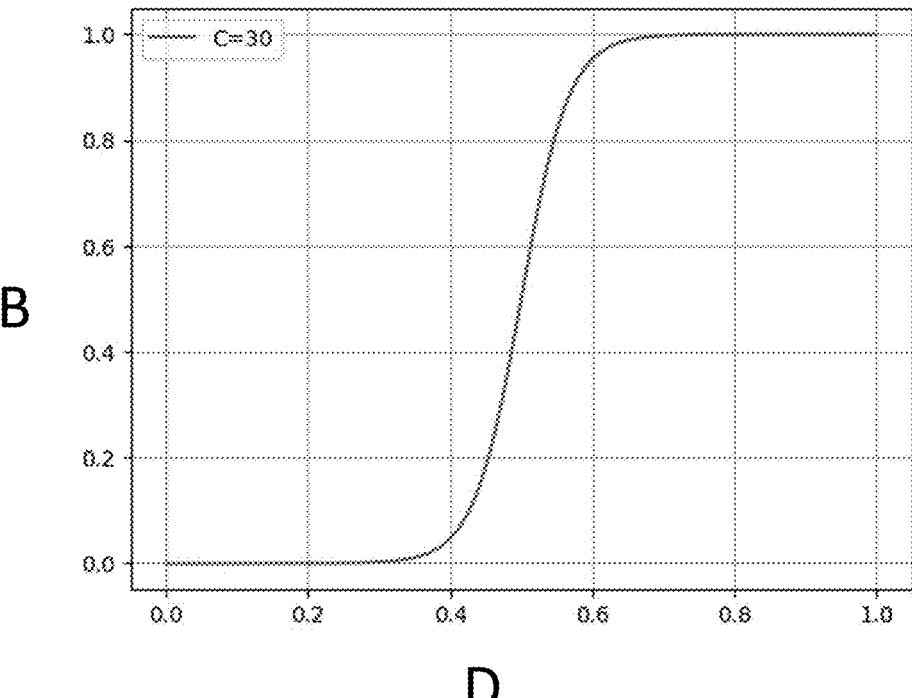

Depending on the characteristics of optical element, different control coefficient C may be used to achieve varying levels of crosstalk reduction. In a preferred embodiment, C is set to be greater than 10, as values above this threshold ensure that when D=1, the output approaches 1 (refer to FIG. 6C). However, the control coefficient C can still be adjusted as needed based on specific requirements. For example, in FIG. 6D, C is set to be 1; in FIG. 6E, C is set to be 30. The brightness of each pixel can be finely adjusted according to its distance and the chosen control coefficient C. For any given pixel, its distance from the edge of the pitch is calculated and used as the input D for the equation, determining its appropriate brightness level.

Figure 7A:
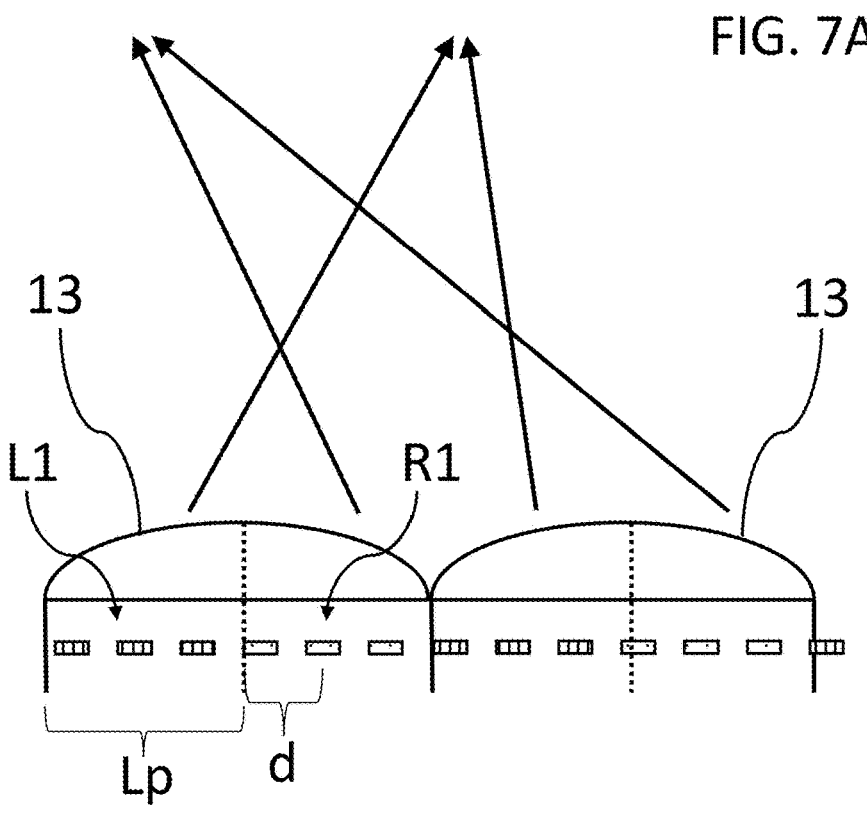
FIGS. 7A-7B illustrate another embodiment featuring a system that delivers separate images to a viewer's eyes, enabling autostereoscopic display.
Figure 7B:
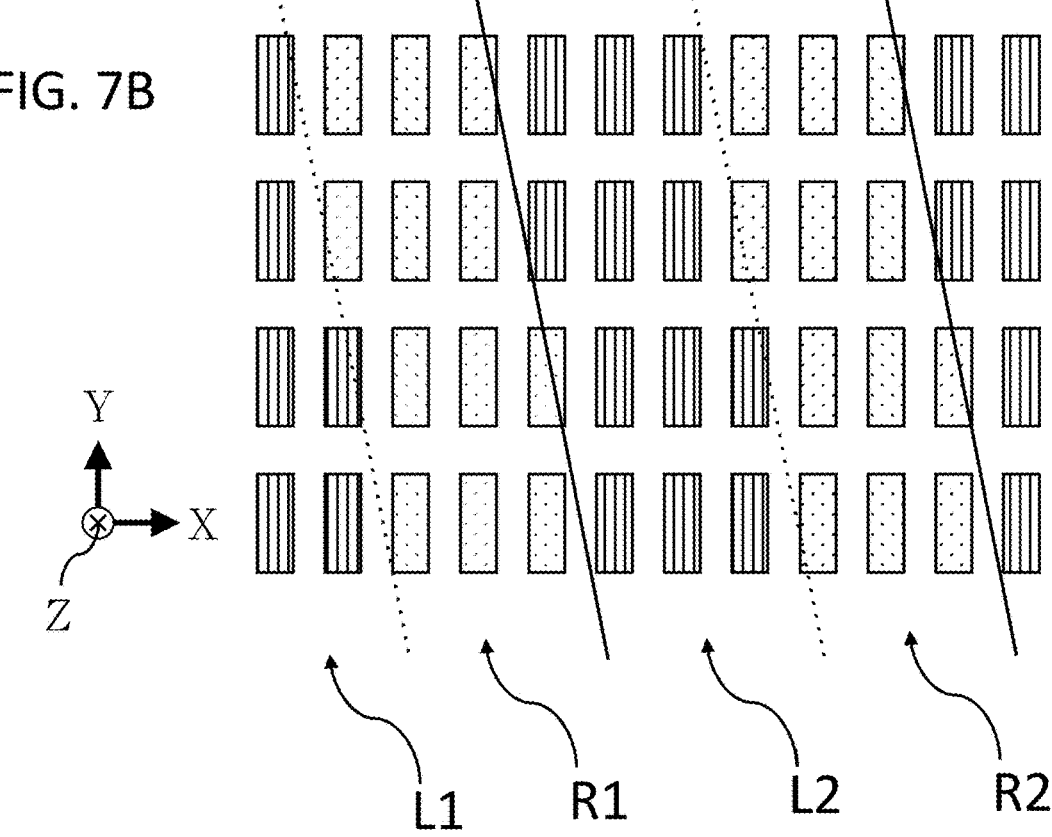

In an embodiment, refer to FIGS. 7A, 7B, a system for providing separate images (e.g., pixel sets L1, R1, L2, R2) to viewer's eyes to thereby provide an autostereoscopic display to the viewer, the system comprising: said autostereoscopic display apparatus comprising means for producing a display which comprises an array of display pixels arranged in rows and columns, and an array of elongated lenticular elements 13 extending parallel to one another overlying the display pixel array and through which the display pixels are viewed, the lenticular elements acting as optical directing means to provide separate images to a viewer's eyes to thereby provide an autostereoscopic display to the viewer, the lenticular elements 13 having the pitch Lp (in the row direction X) greater than the distance d from the pixel to the nearest end of the boundary between adjacent images.

In view of the foregoing, the system may further include the step for calculating ratio B of an optimized brightness to the maximum brightness wherein the ratio is calculated according to equation: $B=1/(1+e^{(-C*(D-0.5))})$, wherein in equation, C is a coefficient greater than 0; D is a ratio of said distance (from given pixel to the nearer end of boundaries) to the pitch Lp (i.e., the pitch between adjacent boundaries, which separate those adjacent images made from different pixels sets) of the optical elements; and B is a ratio of the optimized brightness of any given pixel to the maximum brightness of any given pixel. In short, the autostereoscopic display system includes a display pixel array arranged in rows and columns and an array of lenticular optical elements. These optical elements, having a pitch Lp greater than the pixel-to-boundary distance d, direct separate images to the viewer's eyes, enabling glasses-free 3D viewing.

In another embodiment, a display apparatus may comprise an array of display pixels arranged in rows and columns; an array of elongated optical elements extending parallel to one another and overlying the display pixels; a memory configured to store computer readable instructions; and a processor configured to execute the computer readable instructions such that the processor is configured to, obtain a distance from a given pixel to the nearest end of a boundary separating adjacent images, wherein said adjacent images include a plurality of pixel sets, and through which the pixel sets are viewed, the optical elements acting as optical directing means to provide separate images to a viewer's eyes, thereby providing an autostereoscopic display to the viewer, determine an optimized brightness value of the given pixel based on the following equations: $B=1/(1+e^{(-C*(D-0.5))})$, wherein in equation, C is a coefficient greater than 0, D is a ratio of said distance to a pitch of the optical elements, and B is a ratio of the optimized brightness value to a maximum brightness value of the given pixel.

Figure 9A:
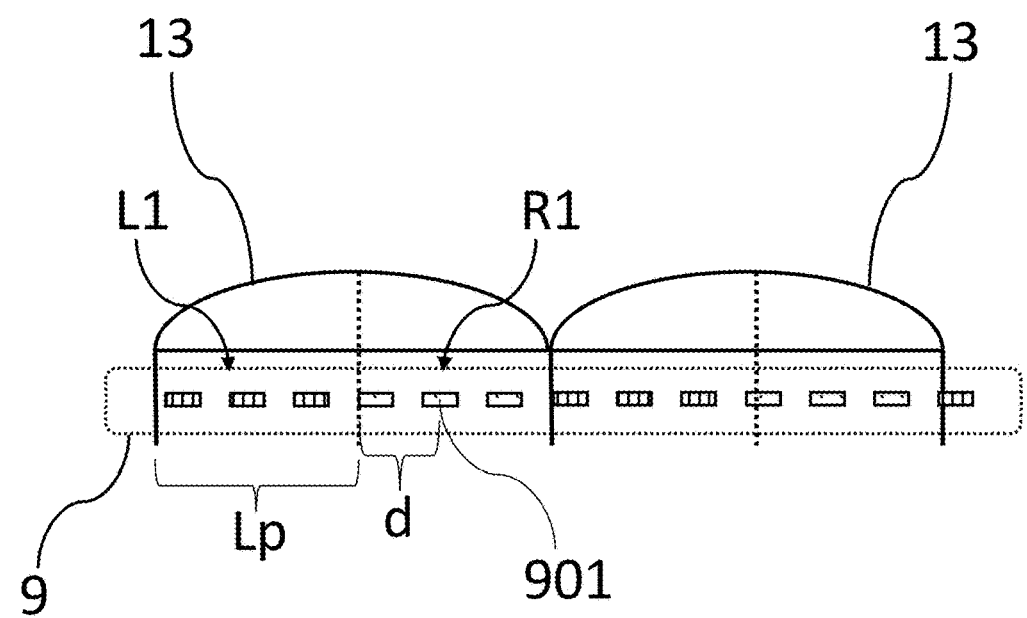
FIGS. 9A-9B present another embodiment utilizing an equation to determine the optimized brightness of any given pixel.
Figure 9B:
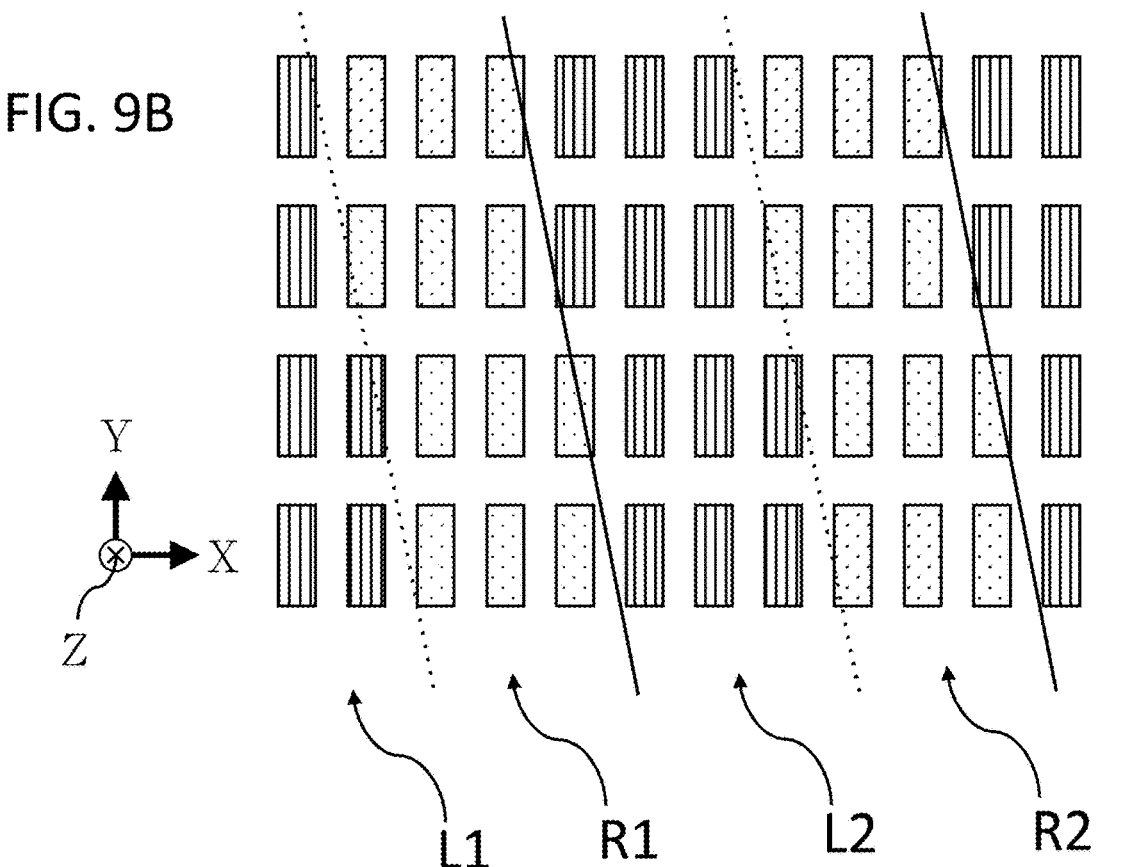

In another embodiment, refer to FIGS. 9A and 9B, a method of determining an optimized brightness value of a given pixel 901, for controlling a display to output a 3D image, wherein the display includes an array 9 of display pixels arranged in rows and columns; and an array of elongated optical elements extending parallel to one another and overlying the display pixels, the method comprising: obtaining a distance d from the given pixel to the nearest end of a boundary separating adjacent images, wherein said adjacent images include a plurality of pixel sets, and through which the pixel sets are viewed, the optical elements acting as optical directing means to provide separate images to a viewer's eyes, thereby providing an autostereoscopic display to the viewer.

The method determines the optimized brightness value based on the equations: $B=1/(1+e^{(-C*(D-0.5))})$, wherein in equation, C is a coefficient greater than 0, D is a ratio of the distance d to a pitch Lp of the optical elements, and B is a ratio of the optimized brightness value to a maximum brightness value of the given pixel. In short, the apparatus includes a display pixel array, elongated optical elements, memory, and a processor. The processor calculates the optimized brightness using the equation above, based on the pixel's distance from the nearest boundary. These components involve: obtaining the pixel's distance d to the nearest boundary separating adjacent images; computing the brightness ratio B using the predefined equation; adjusting the brightness accordingly to reduce crosstalk and enhance 3D clarity.

Figure 8:
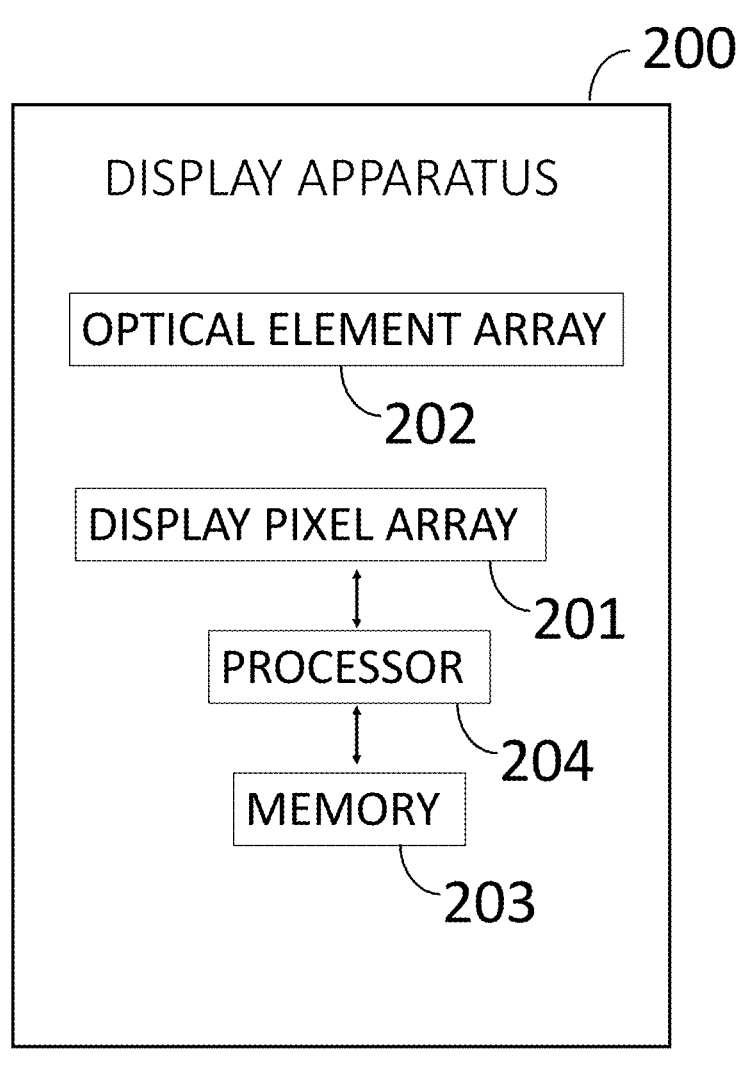
FIG. 8 illustrates another embodiment in which a processor executes computer-readable instructions to provide an autostereoscopic display.

In another embodiment, refer to FIGS. 8, 9A and 9B, a display apparatus 200 for implementing autostereoscopic display is provided. The display apparatus 200 includes: a display pixel array 201 arranged in rows and columns for generating images to be viewed by a viewer; an optical element array 202 disposed above the display pixel array 201, the optical elements 13 (of the optical element array 202) being elongated structures extending in parallel and configured to direct different images (e.g., pixel sets L1, R1, L2, R2) to the viewer's left and right eyes, thereby enabling autostereoscopic perception; a memory 203 configured to store instructions executable by a processor 204; and the processor 204 configured to execute the instructions and perform the following steps: (1) for any given display pixel 901, obtaining a distance d between the pixel 901 and a nearest end of a boundary that separates adjacent images; (2) calculating a distance ratio D=d/Lp, where Lp is a pitch of the optical elements 13 which have the pitch Lp greater than the distance d from the pixel to the nearest end of the boundary between adjacent images in the row direction as shown in FIG. 9A; (3) determining an optimized brightness value ratio B for the pixel 901 based on the distance ratio D, wherein B is derived from a monotonically increasing S-shaped function that is continuously differentiable, approaches 0 as D approaches 0, approaches 1 as D approaches 1, and includes an inflection point at D=0.5.

By utilizing such an S-shaped brightness adjustment function, the system enables pixels located near the center of each image to exhibit higher brightness, while pixels near image boundaries have relatively lower brightness. This configuration reduces crosstalk artifacts in stereoscopic image display and improves visual clarity and stereoscopic perception. In some embodiments, the S-shaped function may be implemented using mathematical models such as a sigmoid function, hyperbolic tangent (tanh) function, error function (erf), or arctangent function, all of which share similar S-shaped profiles and include inflection points. The control coefficients of such functions may be tuned according to application-specific requirements to adjust the slope and curvature of the brightness transition.

Accordingly, the techniques provided by the present invention are applicable to various types of autostereoscopic display devices, including liquid crystal panels coupled with lenticular lenses, light-field displays, and switchable lens arrays. The invention is not limited to any specific display panel or lens fabrication process, offering high versatility and practical applicability in the display industry.

Figure 10:
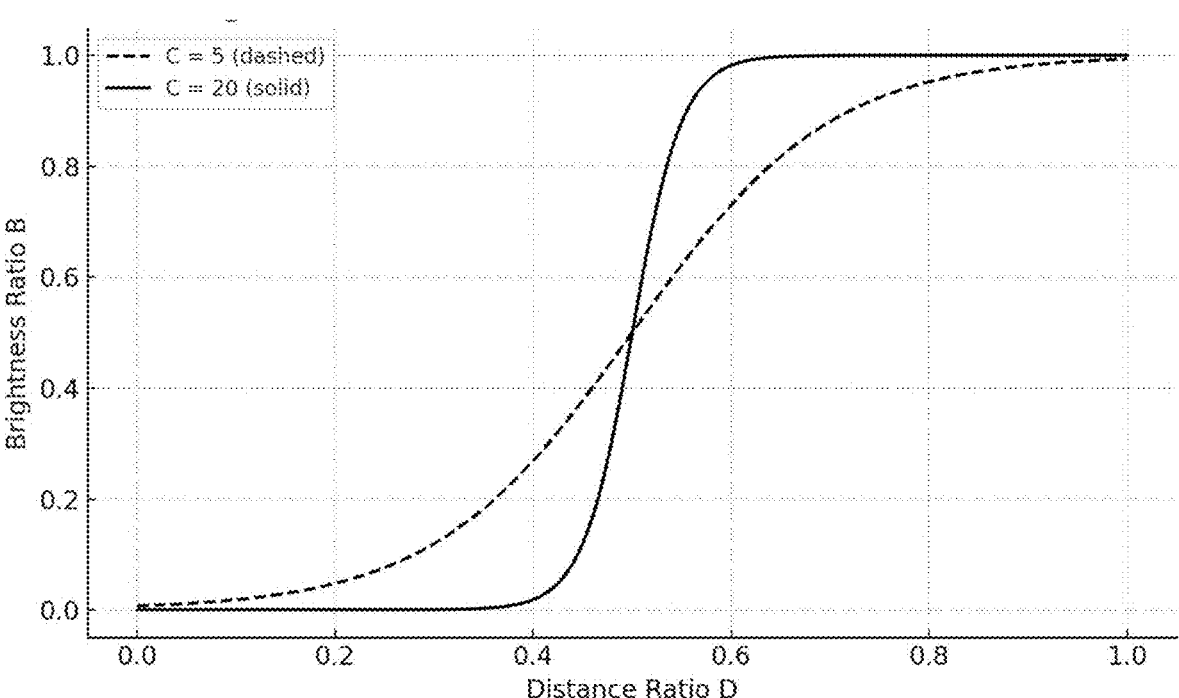
FIG. 10 illustrates another embodiment incorporating an alternative equation for calculating the optimized brightness.

In certain embodiments, the S-shaped function may specifically be a sigmoid function, expressed as: $B=1/(1+e^{(-}$ C×(D−0.5))), where C is a positive control coefficient that governs the steepness of the curve. As the value of C increases, the brightness transition zone becomes narrower, making it suitable for scenarios that require distinct disparity separation. In other embodiments, refer to FIG. 10, the function may be implemented as a hyperbolic tangent (tanh) function, expressed as: B=(1+tanh(C×(D−0.5)))/2. This function is also a continuously differentiable, monotonically increasing function with an S-shaped profile similar to the sigmoid function, and its inflection steepness can be adjusted through the C value.

Figure 11A:
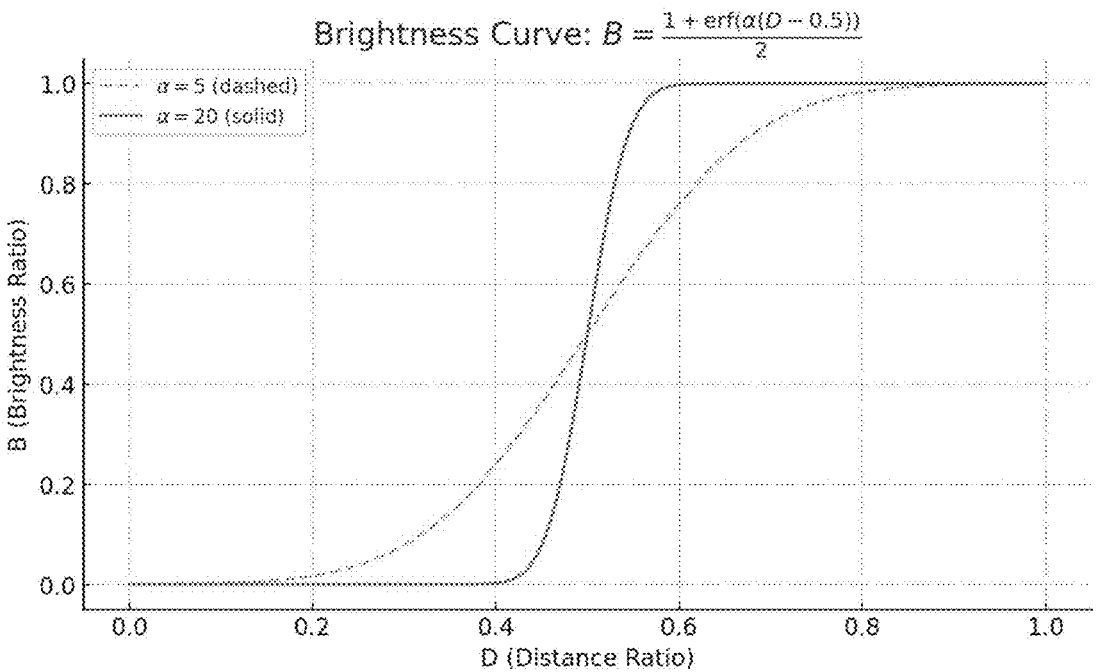
FIGS. 11A-11B illustrate additional embodiments incorporating alternative equations for calculating the optimized brightness.
Figure 11B:
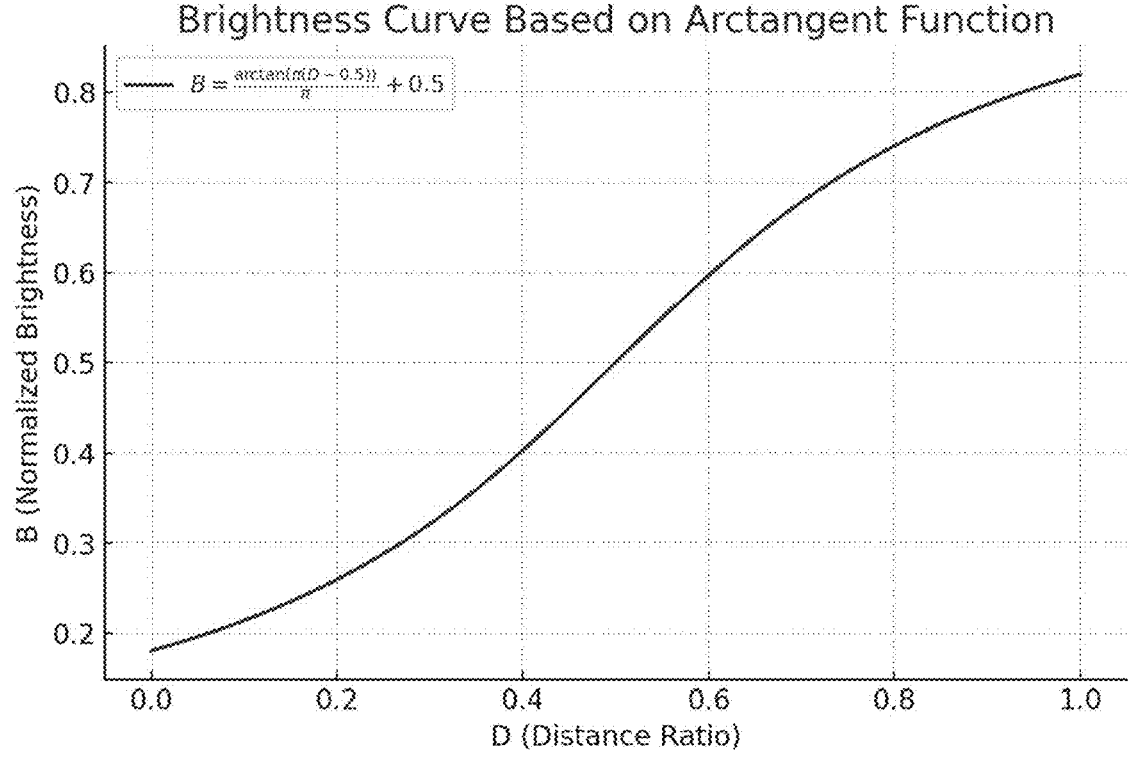

In further embodiments, refer to FIG. 11A, the function may alternatively be selected from the error function (erf) or the arctangent function (arctan), such as: B=(1+erf(α×(D−0.5)))/2, where a is a positive control coefficient. The dashed line corresponds to α=5, indicating a smoother brightness transition, while the solid line corresponds to α=20, representing a steeper transition near the boundary. As shown in the graph, a larger α value results in a more concentrated inflection region. This helps control brightness falloff near image boundaries to reduce crosstalk. In another embodiments, refer to FIG. 11B, the function may alternatively be: B=(arctan(πx(D−0.5))/π)+0.5. These functions are all continuously differentiable and exhibit inflection points and S-shaped curves. They enable smooth brightness transitions across pixels, effectively reducing visual interference near image boundaries.

Figure 12A:
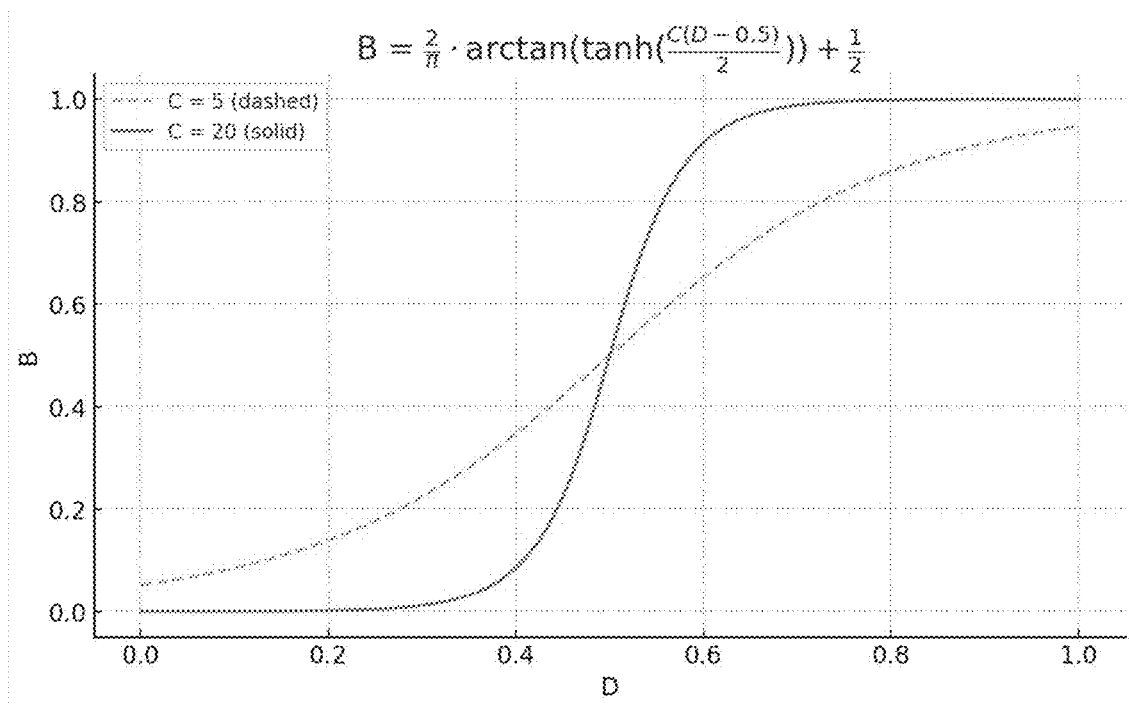
FIGS. 12A-12C illustrate further embodiments incorporating different equations for calculating the optimized brightness.
Figure 12B:
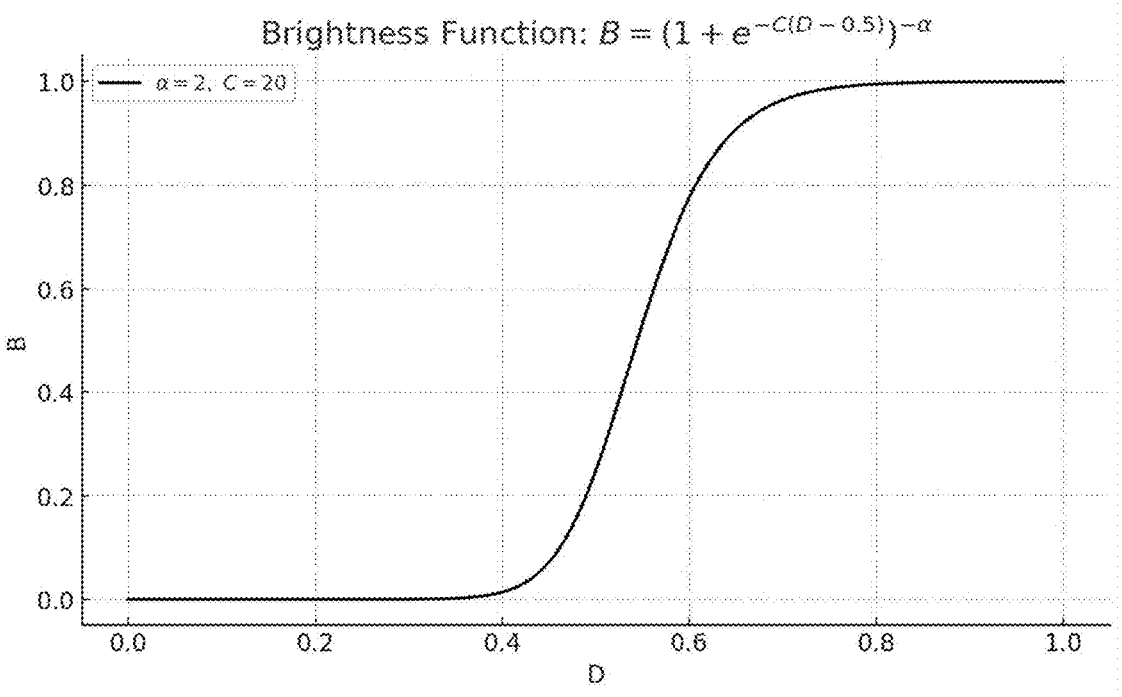

In additional embodiments, the function may be a Gudermannian function, represented as: B=2/π*arctan(tanh(C(D−0.5)/2))+1/2, where C is a positive control coefficient that governs the steepness of the curve. Refer to FIG. 12A, the dashed line corresponds to C=5, indicating a smoother brightness transition; the solid line corresponds to C=20, indicating a sharper transition near the boundary. As shown, higher C values concentrate the inflection region, helping reduce crosstalk by sharply attenuating brightness near image boundaries. In another embodiments, refer to FIG. 12B, the function may be a generalized logistic function, expressed as: B=(1+e^{−C(D−0.5)})^{−α}, where a and C are positive constant controlling the curvature of the transition. Larger α (or C) values amplify the curve's steepness near the inflection point.

Figure 12C:
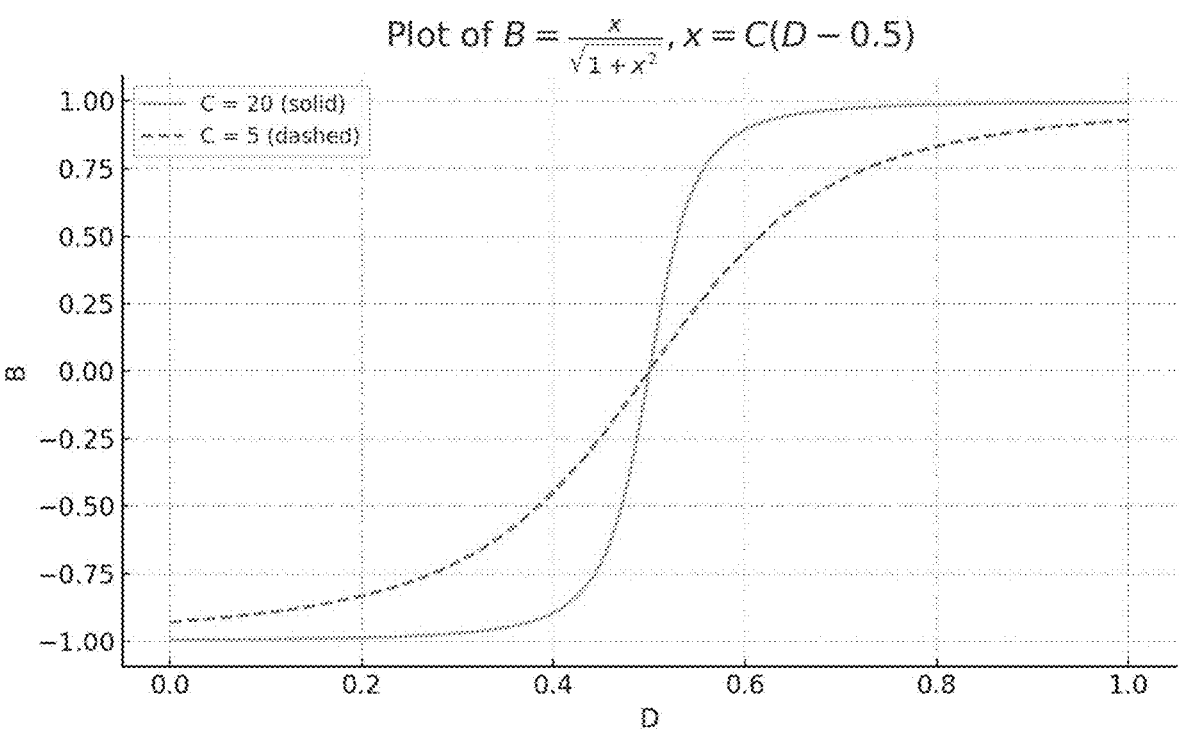

Another example function is: B=x/sqrt(1+x^2), where x=C(D−0.5), refer to FIG. 12C, with different values of the coefficient C. The dashed line represents C=5, and the solid line represents C=20. As the value of C increases, the transition near D=0.5 becomes steeper, indicating a sharper change in brightness around the image boundary region. All these functions share the technical characteristics of being S-shaped, continuously differentiable, and suitable for luminance modulation to reduce crosstalk and enhance image quality in autostereoscopic display systems.

To enhance flexibility in practical applications, the processor may automatically select different types of S-shaped functions and their corresponding parameters based on the device type, viewing distance, disparity requirements, or the dynamic characteristics of the displayed content. For example, when playing fast-changing stereoscopic video, a hyperbolic tangent (tanh) function with a higher control coefficient may be used to achieve more responsive brightness transitions; whereas for static presentations or text-image mixed layouts, a sigmoid or error function (erf) may be selected to provide more stable brightness transitions.

In addition, the selected function may be pre-stored in the memory in the form of a lookup table (LUT). During image display, the processor can quickly reference the table based on the real-time calculated D value to determine the brightness adjustment, thereby improving computational efficiency and reducing power consumption.

The present invention may enhance the quality of autostereoscopic displays by: providing the system that effectively delivers separate images to a viewer's eyes for an improved 3D viewing experience: reducing crosstalk by optimizing pixel brightness based on the pixel's distance from adjacent image boundaries; introducing a computational model that determines optimized brightness values dynamically using the mathematical equation; developing a display apparatus equipped with memory and a processor to automate brightness optimization; establishing a method to compute and control pixel brightness for 3D image output, ensuring clearer stereoscopic effects. All changes and modifications that fall within the metes and bounds of the claims are intended to be embraced by the appended claims.

The invention claimed is:

1. A display apparatus, comprising:

a display pixel array configured to generate images for viewing by a viewer;

an optical element array disposed above the display pixel array, configured to direct different images to a viewer's left and right eyes to enable autostereoscopic perception;

a memory configured to store computer-executable instructions; and a processor configured to execute the instructions, the processor further configured to:

obtain, for any given display pixel, a distance d between the pixel and a nearest end of a boundary separating adjacent images;

calculate a distance ratio D defined as D=d/Lp, wherein Lp is a pitch of the optical elements; and determine an optimized brightness value ratio B for the given display pixel based on the distance ratio D, wherein the optimized brightness value ratio B is a ratio of an optimized brightness value to a maximum brightness value of the given pixel, computed according to an S-shaped function that is continuously differentiable, approaches 0 as the distance ratio D approaches 0, approaches 1 as the distance ratio D approaches 1, and has an inflection point at D=0.5.

2. The display apparatus of claim 1, wherein the S-shaped function used to compute the optimized brightness value ratio B is a hyperbolic tangent function defined as: B=(1+tanh(C×(D−0.5)))/2, wherein C is a positive control coefficient that governs the slope of the brightness curve.

3. The display apparatus of claim 1, wherein the S-shaped function used to compute the optimized brightness value ratio B is an error function, defined as: B=(1+erf(αx(D−0.5)))/2, wherein a is a positive control coefficient that adjusts the steepness of the brightness transition near image boundaries.

4. The display apparatus of claim 1, wherein the S-shaped function used to compute the optimized brightness value ratio B is an arctangent function, defined as: B=(arctan(πx(D−0.5))/π)+0.5, wherein the function is continuously differentiable and shaped to produce a smooth S-curve with said inflection point.

5. The display apparatus of claim 1, wherein the S-shaped function used to compute the optimized brightness value ratio B is a Gudermannian function, defined as: B=2/π*arctan(tanh(C(D−0.5)/2))+1/2, wherein C is a positive control coefficient that governs the steepness of the brightness transition.

6. The display apparatus of claim 1, wherein the S-shaped function used to compute the optimized brightness value ratio B is a generalized logistic function, defined as: $B=(1+e^{\{-C(D-0.5)\}})^{\{-\alpha\}}$, wherein C and a are positive constants that control the curve's slope and sharpness of transition near the inflection point.

7. The display apparatus of claim 1, wherein the S-shaped function used to determine the optimized brightness value ratio Bis defined as: $B=x/sqrt(1+x^2)$, wherein $x=C(D-0.5)$, and C is a positive control coefficient, such that higher values of C produce steeper brightness transitions near D=0.5.

8. The display apparatus of claim 1, wherein the S-shaped function used to determine the brightness adjustment is stored in the memory in the form of a lookup table (LUT), and wherein the processor is configured to access the LUT, based on the calculated distance ratio D, to retrieve a corresponding brightness value.

* * * * *